United States Patent [19]

Minagawa et al.

[11] Patent Number: 4,623,685

[45] Date of Patent: Nov. 18, 1986

[54] THERMOSETTING SYNTHETIC RESIN LACQUER COMPOSITIONS OF IMPROVED LIGHT STABILITY

[75] Inventors: Motonobu Minagawa, Koshigaya; Yutaka Nakahara, Okegawa; Toshihiro Shibata, Omiya; Ryozo Arata, Kyoto, all of Japan

[73] Assignee: Adeka Argus Chemical Co., Ltd., Saitama, Japan

[21] Appl. No.: 714,236

[22] Filed: Mar. 21, 1985

[30] Foreign Application Priority Data

Mar. 21, 1984 [JP] Japan ................................. 59-54068

[51] Int. Cl.$^4$ ............................................... C08K 5/34
[52] U.S. Cl. .................................... 524/99; 524/102; 524/103
[58] Field of Search .......................... 524/99, 102, 103

[56] References Cited

U.S. PATENT DOCUMENTS

| | | | |
|---|---|---|---|
| 4,125,533 | 11/1978 | Murayama et al. | 524/102 |
| 4,131,599 | 12/1978 | Brunetti et al. | 524/102 |
| 4,148,783 | 4/1979 | Rasberger et al. | 524/102 |
| 4,197,236 | 4/1980 | Rosenberger et al. | 524/102 |
| 4,241,208 | 12/1980 | Murayama et al. | 524/102 |
| 4,314,933 | 2/1982 | Berner | 524/102 |
| 4,344,876 | 8/1982 | Berner | 524/91 |
| 4,344,877 | 8/1972 | Nikles et al. | 524/102 |
| 4,351,915 | 9/1982 | Kubota et al. | 524/102 |
| 4,402,983 | 9/1983 | Craven | 524/102 |
| 4,426,471 | 1/1984 | Berner | 524/102 |
| 4,426,472 | 1/1984 | Berner | 524/102 |

*Primary Examiner*—Veronica P. Hoke

[57] ABSTRACT

Thermosetting synthetic resin lacquer compositions are provided having improved resistance to deterioration when exposed to ultraviolet light, comprising a 1-phenoxycarbonyl-2,2,6,6-tetramethylpiperidyl compound.

25 Claims, No Drawings

THERMOSETTING SYNTHETIC RESIN LACQUER COMPOSITIONS OF IMPROVED LIGHT STABILITY

Lacquer coatings are subject to degradation upon exposure to ultraviolet light, resulting in cracking, discoloration and decreased reflectance. Such deterioration is unacceptable in lacquers and finishes, especially automotive finishes, that must have high weatherability.

Light stabilizers have been used to prevent such deterioration of lacquer coatings. However, most conventional stabilizers, such as ultraviolet light absorbers, are unsatisfactory in their stabilizing effect, and are lost by extraction by water. Some conventional stabilizers impart color to the coating.

Various 2,2,6,6-tetraalkylpiperidine compounds have been suggested for use in finishes and lacquer systems.

Japan Kokai 52-22029 (2/1977), 52-51427 (4/1977), 54-88935 (7/1979) and 55-69670 (5/1980) suggest use of 1-unsubstituted 2,2,6,6-tetramethylpiperidine compounds in acrylic lacquers.

Berner U.S. Pat. No. 4,314,933 suggests the use of 2,2,6,6-tetramethylpiperidine compounds in various kinds of finishes and lacquers.

Berner, U.S. Pat. Nos. 4,344,876, patented Aug. 17, 1982, 4,426,471 and 4,426,472, patented Jan. 17, 1984, proposes the stabilization of acid-catalysed stoving lacquers based on hot crosslinkable acrylic, polyester or alkyl resins against the action of light and moisture by the addition of N-substituted polyalkylpiperidine derivatives, which contain a group of the formula (I)

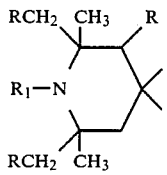

or polymers, the recurring structural units of which contain a group of the formula I or are linked through a bivalent group corresponding to the formula I, wherein $R_1$ represents a free valency, and otherwise R represents hydrogen or methyl and $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl.

Preferred N-substituted polyalkylpiperidine compounds are compounds or polymers which contain a group of the formula (I), wherein R is hydrogen and $R_1$ represents $C_1$–$C_8$ alkanoyl or $C_3$–$C_5$ alkenoyl.

However, these piperidine compounds have an unsatisfactory stabilizing effect, and some of them form salts with acid catalysts, which delay hardening of the resin in the coating.

The formation of such salts can be prevented by using 1-substituted-2,2,6,6-tetramethylpiperidine compounds. However, the 1-substituent greatly reduces the stabilizing effect.

In accordance with this invention, thermosetting synthetic resin lacquer compositions are provided, having an improved resistance to deterioration when exposed to ultraviolet light, comprising 1-phenoxycarbonyl-2,2,6,6-tetramethylpiperidine compounds which do not form salts with acid catalysts, and whose stabilizing effectiveness is high despite the presence of the 1-phenoxy substituent.

The 1-phenoxycarbonyl-2,2,6,6-tetramethylpiperidine compounds of this invention have the group

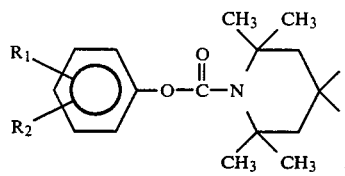

wherein: $R_1$ and $R_2$ are each selected from the group consisting of hydrogen and alkyl having from one to about eighteen carbon atoms.

These 1-phenoxycarbonylpiperidine compounds can be readily prepared by reacting the corresponding 1-unsubstituted-2,2,6,6-tetramethylpiperidine compound with phenyl chloroformate.

The 1-unsubstituted-2,2,6,6-tetramethylpiperidine compounds are known compounds, and disclosed in the prior art, such as Japanese Pat. Nos. 46-31733, 46-31734, 46-31735, 47-1628, 47-7380, 47-8539 and 48-12410; Japan kokai Nos. 46-5082, 47-590, 48-95986, 49-53570, 49-58085, 49-60337, 49-61236, 49-61238, 49-63738, 49-64634, 49-72332, 49-120492, 50-5435, 50-26779, 52-78876, 52-89677, 52-91875, 52-125175, 52-139071, 53-67749, 53-71082, 54-71185, 54-103877, 56-30985, 56-75488, 56-138189, 56-161387, 57-24393, 57-58681, 57-63359, 57-80453, 57-121034, 57-137358, 57-146755, 57-167316, 57-177022, 58-5319, 58-10568, 58-32642, 58-32864, 58-37025, 58-38720, 58-4703058-53931, 58-57444, 58-57445, 58-69879, 58-77862, 58-92660, 58-108238, 58-120646, 58-152053, 58-152881, 58-154739, 58-159460, 58-168634, 58-194862, 58-194931, 58-201777, 58-206594, 58-210094, 58-217554; U.S. Pat. Nos. 3,542,729, 3,640,928, 3,684,765, 3,705,126, 3,893,972, 3,925,376, 3,929,804, 3,940,401, 3,992,390, 3,899,464, 3,984,371, 3,971,795, 3,959,291, 3,993,655, 4,007,158, 4,038,280, 4,061,616, 4,086,204, 4,089,841, 4,096,114, 4,101,508, 4,102,858, 4,104,248, 4,104,251, 4,105,625, 4,107,139, 4,108,829, 4,110,334, 4,115,476, 4,116,927, 4,118,369, 4,128,608, 4,136,081, 4,140,673, 4,144,224, 4,148,784, 4,151,356, 4,154,722, 4,161,592, 4,162,246, 4,166,813, 4,173,599, 4,177,186, 4,185,007, 4,197,236, 4,198,334, 4,210,612, 4,219,465, 4,223,147, 4,234,728, 4,237,297, 4,238,388, 4,238,613, 4,276,401, 4,279,804, 4,288,593, 4,289,686, 4,293,466, 4,293,467, 4,293,468, 4,308,362, 4,309,546, 4,311,820, 4,312,804, 4,315,859, 4,316,025, 4,316,837, 4,317,911, 4,321,374, 4,322,531, 4,326,063, 4,331,586, 4,335,242, 4,336,183, 4,340,534, 4,348,524, 4,351,915, 4,356,279, 4,356,287, 4,356,307, 4,369,274, 4,369,321, 4,376,836, 4,378,443, 4,395,508, 4,400,513, 4,404,301, 4,405,735, 4,408,051, 4,412,021, 4,413,075, 4,413,076, 4,413,093 and 4,413,096.

The 1-phenoxycarbonylpiperidine compounds of this invention are derivatives of the compounds described in above prior art. The preferred class of 1-phenoxycarbonylpiperidines have the following formula II:

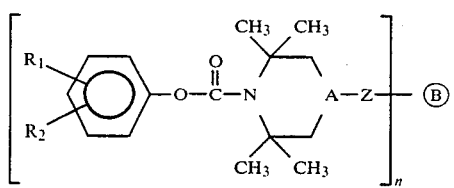

wherein:

A is

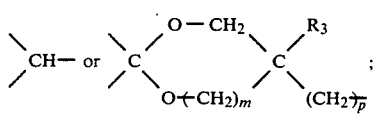

Z is selected from a direct linkage, —O— or —N(R$_4$);
n is a number from 1 to 6;
Ⓑ is selected from hydrogen, hydrocarbyl, residues of organic carboxylic acids having from two to about twenty carbon atoms, from one to about six carboxylic acid groups, and optionally from one to two nitrogen and sulfur atoms; cyanuric acid; and inorganic oxyacids;
R$_1$, R$_2$, R$_3$ and R$_4$ are selected from hydrogen and alkyl having from one to about eighteen carbon atoms;
m is 0 or 1; and
p is 0 to 20.

Exemplary alkyl represented by R$_1$, R$_2$, R$_3$ and R$_4$ include methyl, ethyl, propyl, isopropyl, butyl, isobutyl, sec-butyl, t-butyl, amyl, isoamyl, nonyl, hexyl, isohexyl, heptyl, octyl, isooctyl, tert-octyl, 2-ethylhexyl, decyl, dodecyl, tetradecyl, hexadecyl and octadecyl.

Exemplary hydrocarbyl represented by Ⓑ include alkyl, aryl, arylalkyl and alkylaryl having from one to about twenty-four carbon atoms. The alkyl are as exemplified by R$_1$, R$_2$, R$_3$ and R$_4$ above. Aryl include phenyl and naphthyl; arylalkyl include benzyl and phenethyl; alkylaryl include tolyl, xylyl, isopropylphenyl, dipropylphenyl, butylphenyl, dibutylphenyl, octylphenyl, dioctylphenyl, nonylphenyl, dodecylphenyl and decylphenyl.

Residues of organic carboxylic acids represented by Ⓑ can be from any of the following carboxylic acids: acetic acid, propionic acid, butyric acid, caproic acid, caprylic acid, lauric acid, myristic acid, stearic acid, acrylic acid, methacrylic acid, crotonic acid, oleic acid, hydroxyacetic acid, aminoacetic acid, phenylacetic acid, phenoxyacetic acid, 3,5-di-t-butyl-4-hydroxypropionic acid, laurylthiopropionic acid, benzoic acid, toluic acid, p-t-butyl-benzoic acid, p-hydroxybenzoic acid, salicylic acid, p-methoxy-benzoic acid, 3,5-di-t-butyl-4-hydroxybenzoic acid, nicotinic acid, isonicotinic acid, thiophene-2-carboxylic acid, pyrollidone carboxylic acid, piperidine-4-carboxylic acid, oxalic acid, malonic acid, succinic acid, glutaric acid, adipic acid, sebacic acid, dodecane dioic acid, maleic acid, itaconic acid, bis(3,5-di-t-butyl-4-hydroxybenzyl) malonic acid, thiodipropionic acid, thiodiglycolic acid, iminodiacetic acid, tartaric acid, malic acid, thiomalic acid, dihydrotartaric acid, epoxy succinic acid, 1,4-bis(-carboxyethyl)piperazine, phthalic acid, isophthalic acid, terephthalic acid, tetrahydrophthalic acid, hexahydrophthalic acid, 5-bicyclo(2.2.1)heptene-2,3-dicarboxylic acid, 5-bicyclo(2.2.2)heptene-2,3-dicarboxylic acid, propanetricarboxylic acid, butane tricarboxylic acid, butenetricarboxylic acid, nitrilotriacetic acid, citric acid, tris(carboxyethyl)isocyanurate, tris(carboxymethyl)isocyanurate, trimellitic acid, butanetetracarboxylic acid, ethylenetetracarboxylic acid, ethylenediaminetetracarboxylic acid, pyromellitic acid, 1,3-bis(dicarboxymethylaminomethyl)cyclohexane and 1,6,7,8,9, 14-tetradecanehexacarboxylic acid.

Residues of inorganic oxy acids include the residues of phosphoric acid, phosphorous acid, phosphonic acid, phosphonous acid, substituted phosphonic acid, substituted phosphonous acid, silicic acid, diorganic silicic acid, boric acid and carbonic acid.

The carboxylic acid, isocyanuric acid or inorganic oxy acid mentioned above can be partly esterified or amidated with mono or poly hydric alcohols or amines, and two or more acids may be connected with polyphenol, polyol or polyamine, as in the following formulae:

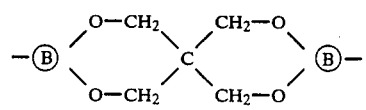

wherein:
B and Z are as in Formula II above;
m is 1 to 10;
Ⓒ is a residue of polyphenol, polyol or polyamine.

Exemplary residues of polyphenol, polyol and polyamine represented by Ⓒ include residues of the following polyphenols:
hydroquinone, 4,4'-isopropylidene bisphenol (bisphenol A), 4,4'-cyclohexylidene diphenol, 4,4'-methylene bisphenol, 4,4'-sulfobisphenol, 2,5-di-t-butylhydroquinone, 2,3,6-trimethylhydroquinone, 2-methylresorcinol; 2,2'-methylenebis(4-methyl-6-t-butylphenol), 2,2'-methylenebis(4-ethyl-6-t-butyl phenol), 2,2'-methylenebis(4-methyl-6-α-methylcyclohexylphenol), 2,2'-n-butylidenebis(4,6-dimethylphenol), 2,2'-isopropylbenzylidenebis(4-ethyl-6-t-butylphenol), 2,2'-thiobis(4-methyl-6-t-butylphenol), 4,4'-methylenebis(2-methyl-6-t-butylphenol), 4,4'-isopropylidenebis(2-phenylethylphenol), 4,4'-n-butylidene-bis(3-methyl-6-t-butylphenol), 4,4'-cyclohexylidenebis(2-t-butylphenol), 4,4'-cyclohexylidenebis(2-t-cyclohexylphenol), 4,4'-thiobis(2-methyl-6-t-butylphenol), 4,4'-thiobis(3-methyl-6-t-butylphenol), 4,4'-sulfobis(3-methyl-6-t-butylphenol), bis(2-methyl-4-hydroxy-5-t-butylbenzyl)sulfide, 1,1,3-tris(2'-methyl-4'-hydroxy-5-t-butylphenyl)butane and 2,2-bis(3'-t-butyl-4'-hydroxyphenyl)-4-(3'',5''-di-t-butyl-4''-hydroxyphenyl)butane;

polyols:
ethyleneglycol, diethyleneglycol, triethyleneglycol, 1,2-propanediol, 1,3-propanediol, 1,4-butanediol, neopentylglycol, thiodiethyleneglycol, 1,6-hexanediol, 1,10-decanediol, 1,4-cyclohexanediol, 1,4-cyclohexanedimethanol, 1,4-benzenedimethanol, 2,2-bis(4'-hydroxycyclohexyl)propane(hydrogenated bisphenol A), glycerine, trimethylolpropane, trimethyololethane and tris(2-hydroxyethyl)-isocyanurate;

polyamines:
ethylenediamine, propylenediamine, hexamethylenediamine, undecamethylenediamine, diethylenetriamine, triethylenetetramine, 1,6,11-triaminoundecane and 4-aminomethyl-1,8-diaminooctane.

Exemplary monophenols include phenol, cresol, 4-t-butylphenol, octylphenol, nonylphenol, 2,4-di-t-butylphenol and 2-cyclohexylphenol.

Exemplary monoalcohols include methanol, ethanol, propanol, isopropanol, butanol, pentanol, hexanol, heptanol, isohexanol, tert-butanol, octanol, 2-ethylhexanol, cyclohexanol, decanol, laurylalcohol, tridecanol, tetradecanol, hexadecanol, octadecanol, methoxyethanol, ethoxyethanol and butoxyethanol.

Exemplary monoamines include dimethylamine, diethylamine, dibutylamine, butylamine, octylamine, t-octylamine, dodecylamine, stearylamine, dimethylaminopropylamine, piperidine and morpholine.

Exemplary compounds of this invention having 1-phenoxycarbonyl-2,2,6,6-tetramethylpiperidyl groups in the molecule include polymers, such as condensates of monosubstituted cyanuric chloride with N,N'-bis(1-aryloxycarbonyl-2,2,6,6-tetramethylpiperidyl) alkylenediamine, ketals derived from 1-aryloxycarbonyl-2,2,6,6-tetramethyl-4-piperidone with polyols such as trimethylolpropane, pentaerythritol, dipentaerythritol, ditrimethylolpropane and sorbitol, and triazaspirodecanes such as 8-aryloxycarbonyl-7,7,9,9-tetramethyl-3-alkyl-1,3,8-triazaspirodecane.

Typical examples of the compounds of this invention are shown below.

(1) 9-Aza-9-phenoxycarbonyl-3,3,8,8,10,10-hexamethyl-1,5-dioxaspiro(5.5)undecane (2) 1-Phenoxycarbonyl-4-benzoyloxy-2,2,6,6-tetramethylpiperidine (3) 9-Aza-9-(4-t-butylphenoxycarbonyl)-8,8,10,10-tetramethyl-3-ethyl-1,5-dioxaspiro(5.5)undecane (4) 1-(p-Methylphenoxycarbonyl)-4-stearoyloxy-2,2,6,6-tetramethylpiperidine (5) 1-Phenoxycarbonyl-4-(β-3',5'-di-t-butyl-4-hydroxyphenylpropionyloxy)-2,2,6,6-tetramethylpiperidine (6) Bis(1-phenoxycarbonyl-2,2,6,6-tetramethyl-4-piperidyl)sebacate (7) Bis(1-phenoxycarbonyl-2,2,6,6-tetramethyl-4-piperidyl)dodecanedioate (8) Bis(1-phenoxycarbonyl-2,2,6,6-tetramethyl-4-piperidyl)-2-butyl-2-(3,5-di-t-butyl-4-hydroxybenzyl)malonate (9) Bis(1-phenoxycarbonyl-2,2,6,6-tetramethyl-4-piperidyl)-2,2-bis-(3,5-di-t-butyl-4-hydroxybenzyl)-malonate

(10) Bis(1-p-chlorophenoxycarbonyl-2,2,6,6-tetramethyl-4-piperidyl)terephthalate

(11) Bis(9-aza-9-phenoxycarbonyl-8,8,10,10-tetramethyl-3-ethyl-1,5-dioxaspiro(5.5)-3-undecylmethyl)methyliminodiacetate

(12) Tris(1-phenoxycarbonyl-2,2,6,6-tetramethyl-4-piperidyl)citrate

(13) Tris(1-phenoxycarbonyl-2,2,6,6-tetramethyl-4-piperidyl)nitrilotriacetate

(14) Tris(1-phenoxycarbonyl-2,2,6,6-tetramethyl-4-piperidyl)butanetricarboxylate

(15) Tris(1-phenoxycarbonyl-2,2,6,6-tetramethyl-4-piperidyl)trimellitate

(16) Tetra(1-phenoxycarbonyl-2,2,6,6-tetramethyl-4-piperidyl)pyromellitate

(17) Tetra(1-phenoxycarbonyl-2,2,6,6-tetramethyl-4-piperidyl)-1,2,3,4-butanetetracarboxylate

(18) Tris(1-phenoxycarbonyl-2,2,6,6-tetramethyl-4-piperidyl)mono(tridecyl)butanetetracarboxylate

(19) Bis(1-phenoxycarbonyl-2,2,6,6-tetramethyl-4-piperidyl)di(tridecyl)butanetetracarboxylate

(20) 2,4,6-Tris(1-phenoxycarbonyl-2,2,6,6-tetramethyl-4-piperidyloxy)-s-triazine

(21) 2,4,6-Tris(1-phenoxycarbonyl-2,2,6,6-tetramethyl-4-piperidylamino)-s-triazine

(22) 2-Dibutylamino-4,6-bis(9-aza-9-phenoxycarbonyl-8,8,10,10-tetramethyl-3-ethyl-1,5-dioxaspiro(5.5)-3-undecylmethoxy)-s-triazine

(23) N,N'-Bis(4,6-bis(9-aza-9-phenoxycarbonyl-8,8,10,10-tetramethyl-3-ethyl-1,5-dioxaspiro(5.5)-3-undecylmethoxy)-s-triazine-2-yl)piperazine

(24) Bis(9-aza-9-phenoxycarbonyl-8,8,10,10-tetramethyl-3-ethyl-1,5-dioxaspiro(5.5)-3-undecylmethyl)carbonate

(25) Bis(9-aza-9-phenoxycarbonyl-8,8,10,10-tetramethyl-3-ethyl-1,5-dioxaspiro(5.5)-3-undecylmethyl)hydrogenated bisphenol A dicarbonate

(26) Bis(1-phenoxycarbonyl-2,2,6,6-tetramethyl-4-piperidyl)pentaerythritol diphosphite

(27) Tetra(1-phenoxycarbonyl-2,2,6,6-tetramethyl-4-piperidyl)bisphenol A diphosphite

(28) Tetra(9-aza-9-phenoxycarbonyl-8,8,10,10-tetramethyl-3-ethyl-1,5-dioxaspiro(5.5)-3-undecylmethyl)4,4'-butylidenebis(2-t-butyl-5-methylphenol)diphosphite

(29) Hexa(1-phenoxycarbonyl-2,2,6,6-tetramethyl-4-piperidyl)tris(2-hydroxyethyl)isocyanurate triphosphite

(30) Tris(1-methylphenoxycarbonyl-2,2,6,6-tetramethyl-4-piperidyl)phosphate

(31) 3,5-Di-t-butyl-4-hydroxybenzyl-bis(1-phenoxycarbonyl-2,2,6,6-tetramethyl-4-piperidyl)phosphonate

(32) Phenyl-bis(1-nonylphenoxycarbonyl-2,2,6,6-tetramethyl-4-piperidyl)phosphinate

(33) Bis(9-aza-9-phenoxycarbonyl-8,8,10,10-tetramethyl-3-ethyl-1,5-dioxaspiro(5.5)-3-undecylmethyl)ether

(34) Bis(9-aza-9-phenoxycarbonyl-8,8,10,10-tetramethyl-3-octanoyloxymethyl-1,5-dioxaspiro(5.5)-3-undecylmethyl)ether

(35) 3-octyl-7,7,9,9-tetramethyl-8-phenoxycarbonyl-1,3,8-triazapiro(5.5)decane-2,4-dione

(36) 1-Phenoxycarbonyl-2,2,6,6-tetramethyl-4-phenoxycarbonylpiperidine

(37) 3,9-Bis(1,1-dimethyl-2-(tris(1-phenoxycarbonyl-2,2,6,6-tetramethyl-4-piperidyloxycarbonyl)butylcarbonyloxy)ethyl)2,4,8,10-tetraoxaspiro(5.5)undecane The amount of 1-phenoxycarbonylpiperidine compound employed is within the range from about 0.001 to about 10 parts by weight, preferably from 0.01 to 5 parts by weight, based on the solvent-free thermosetting resin.

These 1-phenoxycarbonylpiperidine compounds can be readily prepared by reacting the corresponding 1-unsubstituted piperidine compound with phenylchloroformate.

The following Example is illustrative:

EXAMPLE I

9-Aza-3,3,8,8,10,10-hexamethyl-1,5-dioxaspiro(5.5)undecane 2.4 g, phenylchloroformate 1.7 g, sodium carbonate 1.3 g and xylene 10 ml were heated and stirred under reflux. Then, toluene was added, and the reaction mixture filtered. The filtrate was washed with diluted hydrochloric acid, followed by water. The solvent was distilled off, and a pale yellow liquid was obtained, I.R.: 1100 cm$^{-1}$ (based on ketal C—O—C), 1705 cm$^{-1}$ and 1705 cm$^{-1}$ (based on carbonyl C=O).

The liquid was 9-aza-9-phenoxycarbonyl-3,3,8,8,10,10-hexamethyl-1,5-dioxaspiro(5.5)undecane.

The thermosetting synthetic resin lacquers which can be stabilized against deterioration upon exposure to ultraviolet light in accordance with the invention comprise conventional thermosetting synthetic lacquer resins which form no part of this invention. These resins include acrylic resins, alkyd resins and unsaturated polyester resins, which can be modified with melamine/formaldehyde resins, epoxy resins, and polyisocyanates.

The thermosetting synthetic resin lacquers are described, for example, in "Toryo-yo gosei jushi nyumon" (Introduction to Synthetic Resins for Lacquers) by K. Kitaoka, published by Kobunshi Kankokais.

The acrylic resins are discussed on pages 166 to 193, and the polyester resins and alkyd resins are discussed on pages 92 to 133.

The acrylic resin lacquers which can be stabilized against light are conventional acrylic resin stoving lacquers, which are described, for example, in H. Kittel's "Lehrbuch der Lacke and Beschichtungen", Vol. 1, Part 2, on pages 735 and 742 (Berlin 1972), and in "Lackkunstharze" (1977), by H. Wagner and H. F. Sarx, on pages 229–238.

The polyester lacquers which can be stabilized against the action of light conventional stoving lacquers, such as are described in H. Wagner and H. F. Sarx, op. cit., on pages 86–99.

The alkyd resin lacquers which can be stabilized against the action of light are conventional stoving lacquers which are used in particular for coating automobiles (automobile finishing lacquers), for example lacquers based on alkyd/melamine resins and alkyd/acrylic/melamine resins (see H. Wagner and H. F. Sarx, op. cit., pages 99–123).

The acid catalysed stoving lacquers stabilized in accordance with the invention are suitable both for metal finish coatings and solid shade finishes, especially in the case of retouching finishes. The lacquers stabilized in accordance with the invention are preferably applied in the conventional manner by two methods, either by the single-coat method or by the two-coat method. In the latter method, the pigment-containing coat is applied first and then a covering coat of clear lacquer over it.

The lacquers can be dissolved or dispersed in the customary organic solvents, or in water, or can be solvent-free.

When used in two-coat finishes, the piperidine compound can be incorporated either only in the unpigmented finishing lacquer or both in the unpigmented finishing lacquer and in the pigmented priming lacquer.

To obtain maximum light stability, the concurrent use of other conventional light stabilizers can be advantageous. Examples are UV absorbers of the benzophenone type, such as 2-hydroxy-4-methoxybenzophenone, 2-hydroxy-4-n-octoxybenzophenone, 2,2'-dihydroxy-4-methoxybenzophenone and 2,4-dihydroxybenzophenone, UV absorbers of the benzotriazole type, such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-bis($\alpha,\alpha$-dimethylbenzyl)phenyl)benzotriazole, 2-(2'-hydroxy-3',5'-di-t-amylphenyl)benzotriazole, 2-(2'-hydroxy-5'-t-octylphenyl)benzotriazole and 2-(2'-hydroxy-5'-methylphenyl)benzotriazole; UV absorbers of the benzoate type, such as phenylsalicylate, 2,4-di-t-butylphenyl-3,5-di-t-butyl-4-hydroxybenzoate and hexadecyl-3,5,-di-t-butyl-4-hydroxybenzoate; UV absorbers of the acrylate type, such as $\alpha$-cyano-$\beta$-methyl-$\beta$-(p-methoxyphenyl)acrylic acid methyl ester, and UV absorbers of the oxanilide type, such as N-2-ethylphenyl-N'-2-ethoxy-5-t-butylphenyloxamide and N-2-ethylphenyl-N'-2-ethoxyphenyloxamide.

If such compounds are employed, the amount is within the range from about 0.001 to about 5 parts by weight of the thermosetting resin.

The lacquers can contain other conventional ingredients, such as antioxidants, plasticizers, levelling assistants, hardening catalysts, thickeners, dispersants, pigments, and dyes.

The following Examples illustrate preferred embodiments of thermosetting synthetic resin lacquers containing selected 1-phenoxycarbonylpiperidine compounds.

EXAMPLES 1 TO 10

The effect of the light stabilizer in a two-coat metallic effect finish comprising metallic effect priming lacquer and unpigmented finishing lacquer was determined.

(a) Metallic effect priming lacquer

Methyl methacrylate 100 g, n-butylacrylate 66 g, 2-hydroxyethylmethacrylate 30 g, methacrylic acid 4 g, xylene 80 g and n-butanol 20 g were heated and stirred at 110° C. A solution of azobis(isobutyronitrile) 2 g, dodecylmercaptane 0.5 g, xylene 80 g and n-butanol 20 g was then added dropwise over 3 hours. The solution was stirred an additional 2 hours at 110° C. An acrylic resin solution was thus obtained.

The above acrylic resin solution 12 parts, was blended with butoxylated methylolmelamine (Mitsui Toatsu Co., Yuban 20 SE60; solids content 60%) 2.5 parts, cellulose acetobutyrate (20% butylacetate solution) 50 parts, aluminum pigment (Toyo Aluminum Co., Alpaste 1123N) 5.5 parts, xylene 10 parts, butyl acetate 20 parts, and copper phthalocyanine blue 0.2 parts, to obtain a metallic effect priming lacquer.

(b) Unpigmented finishing lacquer

The above acrylic resin solution 48 parts, butoxylatedmethylolmelamine 10 parts, xylene 10 parts, butoxyethylacetate 4 parts and stabilizer as shown in Table I 0.15 part were blended to obtain an unpigmented finishing lacquer.

Pieces of steel sheeting which had been previously coated with a primer were first coated with the priming lacquer (a) and subsequently with the finishing lacquer (b). The priming lacquer was sprayed on to a thickness of about 20μ, and aired for 10 minutes. Then the clear lacquer was sprayed on to a thickness of about 30μ. After being aired 15 minutes, the samples were stoved for 30 minutes at 140° C.

The coated sheets were exposed to ultraviolet light in a Weather-O-Meter. The time in hours when degradation set in, as determined by cracking of the surface of sheet, was noted as hours to failure, and the results are shown in Table I.

TABLE I

| Example No. | Stabilizer | Hours to Failure |
|---|---|---|
| Control 1 | None | 1600 |
| Control 2 | Bis(1,2,2,6,6-pentamethyl-4-piperidyl)sebacate | 2900 |
| Control 3 | Bis(1-ethoxycarbonyl-2,2,6,6-tetramethyl-4-piperidyl)sebacate | 2300 |
| Example 1 | 9-Aza-9-phenoxycarbonyl-3,3,8,8,10,10-hexamethyl-1,5-dioxaspiro(5.5)undecane | 3500 |

TABLE I-continued

| Example No. | Stabilizer | Hours to Failure |
|---|---|---|
| Example 2 | 1-Phenoxycarbonyl-4-($\beta$-3',5'-di-t-butyl-4-hydroxyphenylpropionyloxy)-2,2,6,6-tetramethylpiperidine | 3300 |
| Example 3 | Bis(1-phenoxycarbonyl-2,2,6,6-tetramethyl-4-piperidyl)sebacate | 3800 |
| Example 4 | Tris(1-phenoxycarbonyl-2,2,6,6-tetramethyl-4-piperidyl)nitrilotriacetate | 3200 |
| Example 5 | Tetra(1-phenoxycarbonyl-2,2,6,6-tetramethyl-4-piperidyl)-1,2,3,4-butanetetracarboxylate | 4000 |
| Example 6 | Tris(1-phenoxycarbonyl-2,2,6,6-tetramethyl-4-piperidyl)mono(tridecyl)butanetetracarboxylate | 3800 |
| Example 7 | 2-Dibutylamino-4,6-bis(9-aza-9-phenoxycarbonyl-8,8,10,10-tetramethyl-3-ethyl-1,5-dioxaspiro(5.5)-3-undecylmethoxy)-s-triazine | 3600 |
| Example 8 | Bis(9-aza-9-phenoxycarbonyl-8,8,10,10-tetramethyl-3-ethyl-1,5-dioxaspiro(5.5)-3-undecylmethyl)hydrogenated bisphenol A dicarbonate | 3600 |
| Example 9 | Tris(1-methylphenoxycarbonyl-2,2,6,6-tetramethyl-4-piperidyl)phosphate | 3200 |
| Example 10 | 1-Phenoxycarbonyl-2,2,6,6-tetramethyl-4-phenoxycarbonylpiperidine | 3400 |

The improved resistance to light deterioration of the lacquer compositions of the invention as compared to the Controls is apparent from the above data.

EXAMPLES 11 TO 20

The test specimens were prepared according to the same procedure as in Examples 1 to 10, using the mixture of 70 parts of alkyl resin modified with coconut oil (Dainippon Ink & Chemicals Inc.; solids content 60%), 30 parts of butoxylated methylol melamine (Yuban 20 SE60) and 0.6 parts of the stabilizer as shown in Table II as a finishing lacquer. The coated sheets were exposed to ultraviolet light in a Weather-O-Meter. The time in hours when degradation set in, as determined by cracking of the surface of the sheet, was noted as hours to failure, and the results are shown in Table II.

TABLE II

| Example No. | Stabilizer | Hours to Failure |
|---|---|---|
| Control 1 | None | 900 |
| Control 2 | Bis(1,2,2,6,6-pentamethyl-4-piperidyl)sebacate | 1800 |
| Control 3 | Bis(1-ethoxycarbonyl-2,2,6,6-tetramethyl-4-piperidyl)sebacate | 1600 |
| Example 11 | 9-Aza-9-(4-t-butylphenoxycarbonyl)-8,8,10,10-tetramethyl-3-ethyl-1,5-dioxaspiro(5.5)undecane | 2300 |
| Example 12 | Bis(1-phenoxycarbonyl-2,2,6,6-tetramethyl-4-piperidyl)sebacate | 2700 |
| Example 13 | Bis(1-p-chlorophenoxycarbonyl-2,2,6,6-tetramethyl-4-piperidyl)terephthalate | 2400 |
| Example 14 | Tris(1-phenoxycarbonyl-2,2,6,6-tetramethyl-4-piperidyl)butanetricarboxylate | 2200 |
| Example 15 | Tetra(1-phenoxycarbonyl-2,2,6,6-tetramethyl-4-piperidyl)-1,2,3,4-butanetetracarboxylate | 2800 |
| Example 16 | Bis(1-phenoxycarbonyl-2,2,6,6-tetramethyl-4-piperidyl)di(tridecyl)butanetetracarboxylate | 2700 |
| Example 17 | 2,4,6-Tris(1-phenoxycarbonyl-2,2,6,6-tetramethyl-4-piperidylamino)-s-triazine | 2400 |
| Example 18 | Bis(1-phenoxycarbonyl-2,2,6,6-tetramethyl-4-piperidyl)pentaerythritol diphosphite | 2300 |
| Example 19 | Bis(9-aza-9-phenoxycarbonyl-8,8,10,10-tetramethyl-3-ethyl-1,5-dioxaspiro(5.5)-3-undecylmethyl)ether | 2400 |
| Example 20 | 3,9-Bis(1,1-dimethyl-2-(tris(1-phenoxycarbonyl-2,2,6,6-tetramethyl-4-piperidyloxycarbonyl)butylcarbonyloxy)ethyl)2,4,8,10-tetraoxaspiro(5.5)undecane | 2600 |

The improved resistance to light deterioration of the lacquer compositions of the invention as compared to the Controls is apparent from the above data.

EXAMPLES 21 TO 30

Styrene 20 g, methyl methacrylate 20 g, butyl acrylate 20 g, 2-ethylhexyl methacrylate 22 g, 2-hydroxyethyl methacrylate 15 g and methacrylic acid 3 g were polymerized in xylene using azobis(isobutyronitrile) as a polymerization initiator. An acrylic resin solution of solids content 50% was thus prepared.

The above acrylic resin solution 14 parts, butoxylated methylol melamine (Yuban 20 SE60) 5 parts, aluminum pigment (Alpaste 1123N) 6 parts, xylene 10 parts and 0.2 part of stabilizer as shown in Table III were blended to form a metallic effect finishing lacquer.

Pieces of steel sheeting previously coated with a primer were coated with this lacquer. The lacquer was sprayed on to a thickness of about 40μ, and aired for 10 minutes, and then the samples were stoved for 30 minutes at 140° C.

The coated sheets were exposed to ultraviolet light in a Weather-O-Meter for 3000 hours. The reflectances of the sheets before and after exposure were measured, and the results are shown in Table III as 60° gloss.

TABLE III

| Example No. | Stabilizer | 60° gloss Original | 60° gloss After exposure |
|---|---|---|---|
| Control 1 | None | 92 | 9 |
| Control 2 | Bis(1,2,2,6,6-pentamethyl-4-piperidyl)sebacate | 93 | 31 |
| Control 3 | Bis(1-ethoxycarbonyl-2,2,6,6-tetramethyl-4-piperidyl)sebacate | 92 | 22 |
| Example 21 | 9-Aza-9-phenoxycarbonyl-3,3,8,8,10,10-hexamethyl-1,5-dioxaspiro(5.5)undecane | 93 | 47 |
| Example 22 | Bis(1-phenoxycarbonyl-2,2,6,6-tetramethyl-4-piperidyl)sebacate | 93 | 50 |
| Example 23 | Bis(9-aza-9-phenoxycarbonyl-8,8,10,10-tetramethyl-3-ethyl-1,5-dioxaspiro(5.5)-3-undecylmethyl)methyliminodiacetate | 92 | 44 |
| Example 24 | Tetra(1-phenoxycarbonyl-2,2,6,6-tetramethyl-4-piperidyl)pyromellitate | 92 | 45 |
| Example 25 | Tetra(1-phenoxycarbonyl-2,2,6,6-tetramethyl-4-piperidyl)-1,2,3,4-butanetetracarboxylate | 93 | 52 |
| Example 26 | Bis(1-phenoxycarbonyl-2,2,6,6-tetramethyl-4-piperidyl)di(tridecyl)butanetetracarboxylate | 93 | 53 |
| Example 27 | 2-Dibutylamino-4,6-bis(9-aza-9-phenoxycarbonyl-8,8,10,10-tetramethyl-3-ethyl-1,5-dioxaspiro(5.5)-3-undecyl- | 92 | 50 |

TABLE III-continued

| Example No. | Stabilizer | 60° gloss Original | 60° gloss After exposure |
|---|---|---|---|
| | methoxy)-2-triazine | | |
| Example 28 | Tetra(9-aza-9-phenoxycarbonyl-8,8,10,10-tetramethyl-3-ethyl-1,5-dioxaspiro(5.5)-3-undecyl-methyl)4,4'-butylidenebis(2-t-butyl-5-methylphenol) diphosphite | 91 | 47 |
| Example 29 | 3-octyl-7,7,9,9-tetramethyl-8-phenoxycarbonyl-1,3,8-triazaspiro(5.5)decane-2,4-dione | 91 | 45 |
| Example 30 | 3,9-Bis(1,1-dimethyl-2-(tris(1-phenoxycarbonyl-2,2,6,6-tetramethyl-4-piperidyloxy-carbonyl)butylcarbonyloxy)ethyl)2,4,8,10-tetraoxaspiro(5.5)undecane | 93 | 52 |

The improved resistance to light deterioration of the lacquer compositions of the invention as compared to the Controls is apparent from the above data.

EXAMPLES 31 TO 40

Unsaturated polyester resin (Bayer; L/Ue6108) 75 parts, blocked polyisocyanate (Bayer; L/Ue6108) 25 parts, titanium dioxide 30 parts, copper phthalocyanine blue 1 part and 1 part of stabilizer as shown in Table IV were dispersed in a mixture of toluene 70 parts, xylene 80 parts and butylacetate 100 parts to form a finishing lacquer.

Pieces of steel sheeting, which had previously been coated with a primer, were coated with this lacquer. The lacquer was sprayed on to a thickness of about 30μ, and aired for 15 minutes, and then the samples were stoved for 30 minutes at 180° C.

The coated sheets were exposed to ultraviolet light in a Weather-O-Meter for 1000 hours. The reflectances of the sheets before and after exposure were measured, and the results are shown in Table IV as 60° gloss.

TABLE IV

| Example No. | Stabilizer | 60° gloss Original | 60° gloss After exposure |
|---|---|---|---|
| Control 1 | None | 94 | 37 |
| Control 2 | Bis(1,2,2,6,6-penta-methyl-4-piperidyl)sebacate | 94 | 55 |
| Control 3 | Bis(1-ethoxycarbonyl-2,2,6,6-tetramethyl-4-piperidyl)sebacate | 93 | 46 |
| Example 31 | 9-Aza-9-phenoxycarbonyl-3,3,8,8,10,10-hexa-methyl-1,5-dioxaspiro(5.5)undecane | 94 | 70 |
| Example 32 | Bis(1-phenoxycarbonyl-2,2,6,6-tetramethyl-4-piperidyl)sebacate | 95 | 72 |

TABLE IV-continued

| Example No. | Stabilizer | 60° gloss Original | 60° gloss After exposure |
|---|---|---|---|
| Example 33 | Bis(1-phenoxycarbonyl-2,2,6,6-tetramethyl-4-piperidyl)-2-butyl-2-(3,5-di-t-butyl-4-hydroxybenzyl)malonate | 94 | 65 |
| Example 34 | Tris(1-phenoxycarbonyl-2,2,6,6-tetramethyl-4-piperidyl)citrate | 94 | 67 |
| Example 35 | Tetra(1-phenoxycarbonyl-2,2,6,6-tetramethyl-4-piperidyl)-1,2,3,4-butanetetracarboxylate | 95 | 73 |
| Example 36 | Bis(1-phenoxycarbonyl-2,2,6,6-tetramethyl-4-piperidyl)di(tridecyl)butanetetracarboxylate | 95 | 73 |
| Example 37 | Bis(9-aza-9-phenoxy-carbonyl-8,8,10,10-tetramethyl-3-ethyl-1,5-dioxaspiro(5.5)-3-undecylmethyl)hydrogenated bisphenol A dicarbonate | 94 | 70 |
| Example 38 | Bis(9-aza-9-phenoxy-carbonyl-8,8,10,10-tetramethyl-3-ethyl-1,5-dioxaspiro(5.5)-3-undecylmethyl)ether | 94 | 69 |
| Example 39 | 1-Phenoxycarbonyl-2,2,6,6-tetramethyl-4-phenoxycarbonylpiperidine | 94 | 68 |
| Example 40 | 3,9-Bis(1,1-dimethyl-2-(tris(1-phenoxycarbonyl-2,2,6,6-tetramethyl-4-piperidyloxycarbonyl)butylcarbonyloxy)ethyl)2,4,8,10-tetraoxaspiro(5.5)undecane | 95 | 72 |

The improved resistance to light deterioration of the lacquer compositions of the invention as compared to the Controls is apparent from the above data.

EXAMPLES 41 TO 50

Test specimens were prepared according to the same procedure as in Examples 1 to 10, using a mixture of 14 parts of acrylic acid resin (Mitsui Toatsu Co.; Almatex; solids content 50%), 5 parts of butoxylated methylol melamine (Yuban 20 SE60) 15 parts of toluene, 0.15 part of stabilizer as shown in Table V, and 0.04 part of p-toluene sulfonic acid, as a finishing lacquer, and stoved at 110° C.

The coated sheets were exposed to ultraviolet light in a Weather-O-Meter for 2000 hours. The reflectances of the sheets before and after exposure were measured, and the results are shown in Table V as 60° gloss.

The formation of precipitates in the above finishing lacquers after storage for 14 days at room temperature was noted, and the results are also shown in Table V. A precipitate indicates salt formation with catalyst residues.

TABLE V

| Example No. | Stabilizer | 60° gloss Original | 60° gloss After exposure | Formation of Precipitate |
|---|---|---|---|---|
| Control 1 | None | 93 | 18 | None |
| Control 2 | Bis(1,2,2,6,6-pentamethyl-4-piperidyl)sebacate | 93 | 44 | Formed |
| Control 3 | Bis(1-ethoxycarbonyl-2,2,6,6-tetramethyl-4-piperidyl)sebacate | 92 | 29 | None |
| Example 41 | 9-Aza-9-phenoxycarbonyl-3,3,8,8,10,10-hexamethyl-1,5-dioxaspiro(5.5)undecane | 93 | 61 | None |

TABLE V-continued

| Example No. | Stabilizer | 60° gloss Original | 60° gloss After exposure | Formation of Precipitate |
|---|---|---|---|---|
| Example 42 | Bis(1-phenoxycarbonyl-2,2,6,6-tetramethyl-4-piperidyl)sebacate | 93 | 63 | None |
| Example 43 | Tetra(1-phenoxycarbonyl-2,2,6,6-tetramethyl-4-piperidyl)-1,2,3,4-butanetetracarboxylate | 93 | 64 | None |
| Example 44 | Tris(1-phenoxycarbonyl-2,2,6,6-tetramethyl-4-piperidyl)mono(tridecyl)butanetetracarboxylate | 92 | 62 | None |
| Example 45 | Bis(1-phenoxycarbonyl-2,2,6,6-tetramethyl-4-piperidyl)di(tridecyl)butanetetracarboxylate | 93 | 62 | None |
| Example 46 | 2,4,6-Tris(1-phenoxycarbonyl-2,2,6,6-tetramethyl-4-piperidylamino)-s-triazine | 93 | 60 | None |
| Example 47 | Bis(9-aza-9-phenoxycarbonyl-8,8,10,10-tetramethyl-3-ethyl-1,5-dioxaspiro(5.5)-3-undecylmethyl)hydrogenated bisphenol A dicarbonate | 92 | 60 | None |
| Example 48 | Bis(9-aza-9-phenoxycarbonyl-8,8,10,10-tetramethyl-3-ethyl-1,5-dioxaspiro(5.5)-3-undecylmethyl)ether | 92 | 58 | None |
| Example 49 | 1-Phenoxycarbonyl-2,2,6,6-tetramethyl-4-phenoxycarbonylpiperidine | 93 | 60 | None |
| Example 50 | 3,9-Bis(1,1-dimethyl-2-(tris(1-phenoxycarbonyl-2,2,6,6-tetramethyl-4-piperidyloxycarbonyl)butylcarbonyloxy)ethyl)2,4,8,10-tetraoxaspiro(5.5)undecane | 93 | 62 | None |

The improved resistance to light deterioration of the lacquer compositions of the invention as compared to the Controls is apparent from the above data.

It is also noteworthy that the 1-phenoxycarbonyl-2,2,6,6-tetramethyl piperidyl compounds do not form salts, unlike Control 2, which had only $CH_3$ in the 1-position.

Having regard to the foregoing disclosure the following is claimed as the inventive and patentable embodiments thereof:

1. A thermosetting synthetic resin lacquer composition having an improved resistance to deterioration when exposed to ultraviolet light, comprising a 1-phenoxycarbonyl-2,2,6,6-tetramethyl piperidine compound which does not form salts with acid catalysts and having the formula:

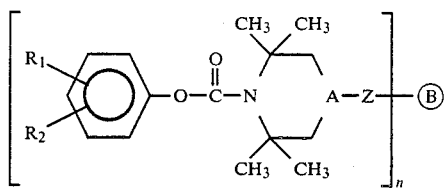

wherein:
A is

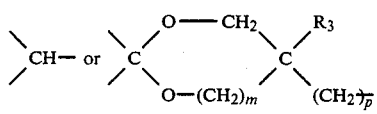

Z is selected from the group consisting of a direct linkage; —O—; and —N($R_4$);
n is a number from 1 to 6;
Ⓑ is selected from hydrogen, hydrocarbyl, residues of organic carboxylic acids having from two to about twenty carbon atoms, from one to about six carboxylic acid groups, and optionally from one to two nitrogen and sulfur atoms; isocyanuric acid; and inorganic oxyacids;

$R_1$, $R_2$, $R_3$ and $R_4$ are selected from hydrogen and alkyl having from one to about eighteen carbon atoms;
m is 0 or 1; and
p is 0 to 20.

2. A thermosetting synthetic resin lacquer composition according to claim 1 in which $R_1$ and $R_2$ are each hydrogen.

3. A thermosetting synthetic resin lacquer composition according to claim 1 in which $R_1$ and $R_2$ are each alkyl.

4. A thermosetting synthetic resin lacquer composition according to claim 1 in which $R_1$ is hydrogen and $R_2$ is alkyl.

5. A thermosetting synthetic resin lacquer composition according to claim 1 in which Ⓑ is hydrogen.

6. A thermosetting synthetic resin lacquer composition according to claim 1 in which B is hydrocarbyl.

7. A thermosetting synthetic resin lacquer composition according to claim 1 in which Ⓑ is a residue of an organic carboxylic acid.

8. A thermosetting synthetic resin lacquer composition according to claim 1 in which Ⓑ is isocyanuric acid.

9. A thermosetting synthetic resin lacquer composition according to claim 1 in which Ⓑ is inorganic oxyacid selected from the group consisting of phosphoric acid, phosphorous acid, phosphonic acid, phosphonous acid, substituted phosphonic acid, substituted phosphonous acid, silicic acid, diorganic silicic acid, boric acid and carbonic acid.

10. A thermosetting synthetic resin lacquer composition according to claim 1 in which the carboxylic acid, isocyanuric acid or inorganic oxy acid is esterified with a mono or poly hydric alcohol.

11. A thermosetting synthetic resin lacquer composition according to claim 1 in which the carboxylic acid, isocyanuric acid or inorganic oxy acid is amidated with a mono or polyamine.

12. A thermosetting synthetic resin lacquer composition according to claim 10 in which at least two acids in the formula:

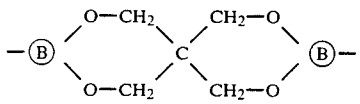

are esterified with a mono or poly hydric alcohol.

13. A thermosetting synthetic resin lacquer composition according to claim 10 in which at least two acids in the formula:

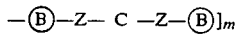

wherein:

Ⓑ is selected from hydrogen, hydrocarbyl, residues of organic carboxylic acids having from two to about twenty carbon atoms, from one to about six carboxylic acid groups, and optionally from one to two nitrogen and sulfur atoms; isocyanuric acid; and inorganic oxyacids;

Z is selected from the group consisting of a direct linkage; —O—; and —N($R_4$);

m is 1 to 10; and

Ⓒ is a residue of polyphenol, polyol or polyamine are esterified with a mono or poly hydric alcohol.

14. A thermosetting synthetic resin lacquer composition according to claim 1, in which the 1-phenoxycarbonyl-2,2,6,6-tetramethyl piperidine compound is bis(1-phenoxycarbonyl-2,2,6,6-tetramethyl-4-piperidyl)sebacate.

15. A thermosetting synthetic resin lacquer composition according to claim 1, in which the 1-phenoxycarbonyl-2,2,6,6-tetramethyl piperidine compound is tetra(1-phenoxycarbonyl-2,2,6,6-tetramethyl-4-piperidyl)-1,2,3,4-butanetetracarboxylate.

16. A thermosetting synthetic resin lacquer composition according to claim 1, in which the 1-phenoxycarbonyl-2,2,6,6-tetramethyl piperidine compound is tris(1-phenoxycarbonyl-2,2,6,6-tetramethyl-4-piperidyl)-mono(tridecyl)butanetetracarboxylate.

17. A thermosetting synthetic resin lacquer composition according to claim 1, in which the 1-phenoxycarbonyl-2,2,6,6-tetramethyl piperidine compound is 2-dibutylamino-4,6-bis(9-aza-9-phenoxycarbonyl-8,8,10,10-tetramethyl-3-ethyl-1,5-dioxaspiro (5.5)-3-undecylmethoxy)-s-triazine.

18. A thermosetting synthetic resin lacquer composition according to claim 1, in which the 1-phenoxycarbonyl-2,2,6,6-tetramethyl piperidine compound is 3,9-bis(1,1-dimethyl-2-(tris(1-phenoxycarbonyl-2,2,6,6-tetramethyl-4-piperidyloxycarbonyl)butylcarbonyloxy)ethyl) 2,4,8,10-tetraoxaspiro(5.5)undecane.

19. A thermosetting synthetic resin lacquer composition according to claim 1 in which the amount of 1-phenoxycarbonyl-2,2,6,6-tetramethyl piperidine compound is within the range from about 0.001 to about 10 parts by weight, based on the solvent-free thermosetting resin.

20. A thermosetting synthetic resin lacquer composition according to claim 1 in which the amount of 1-phenoxycarbonyl-2,2,6,6-tetramethyl piperidine compound is within the range from about 0.01 to about 5 parts by weight, based on the solvent-free thermosetting resin.

21. A thermosetting synthetic resin lacquer composition according to claim 1 in which the thermosetting synthetic resin is an acrylic resin.

22. A thermosetting synthetic resin lacquer composition according to claim 1 in which the thermosetting synthetic resin is an alkyd resin.

23. A thermosetting synthetic resin lacquer composition according to claim 1 in which the thermosetting synthetic resin is an unsaturated polyester resin.

24. A thermosetting synthetic resin lacquer composition according to claim 1 in which the composition which further comprises another light stabilizer selected from the group consisting of UV absorbers of the benzophenone type, UV absorbers of the benzotriazole type, UV absorbers of the benzoate type, UV absorbers of the acrylate type, and UV absorbers of the oxanilide type.

25. A thermosetting synthetic resin lacquer composition according to claim 24 in which another light stabilizer compound is employed in an amount within the range from about 0.001 to about 5 parts by weight of the thermosetting resin.

* * * * *